UNITED STATES PATENT OFFICE 2,451,587

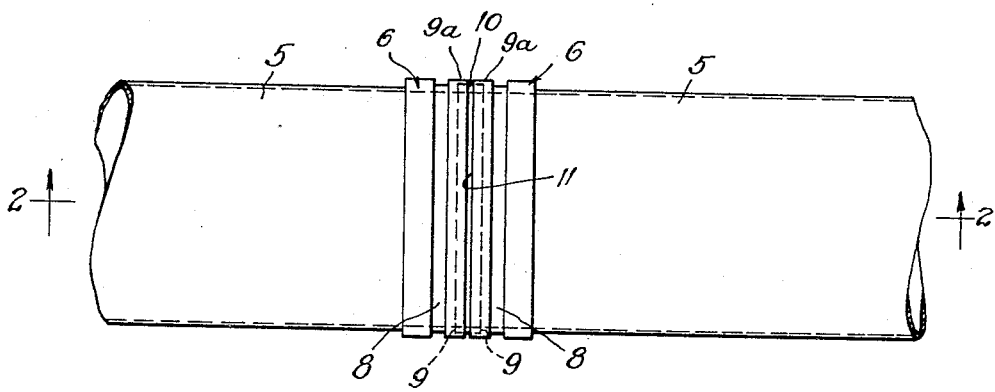
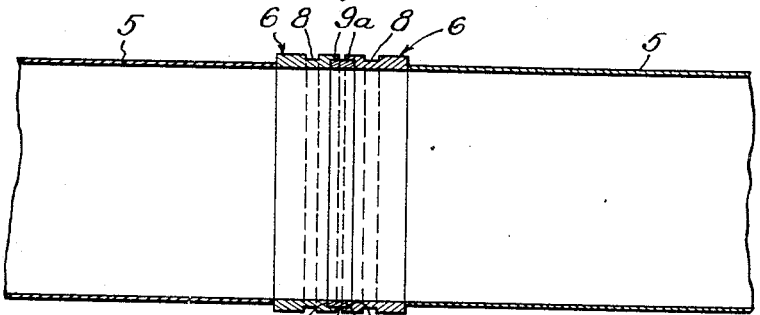
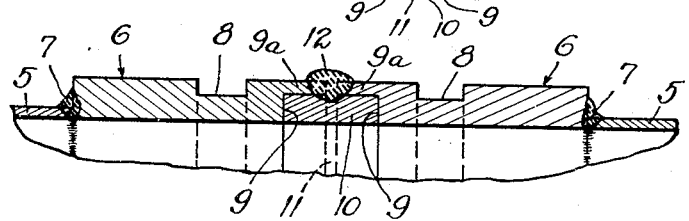
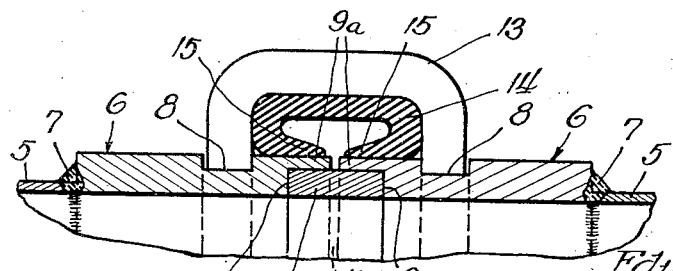

PIPE END AND JOINT

Edward Hall Taylor, Winnetka, Ill., assignor to Taylor Forge & Pipe Works, Cicero, Ill., a corporation of Illinois Application May 7, 1945, Serial No. 592,412

3 Claims. (Cl. 285—111)

This invention relates to pipe ends and joints, and has to do with a pipe end assembly for joining the ends of pipes and with a pipe joint resulting from the use of such assembly.

Steel pipe is kept in stock in various parts of the country so as to be readily available as required. Much of this stock is in standard pipe sizes of substantially uniform wall thickness, usually materially greater than one-eighth of an inch and, in pipe of the larger diameters, one-quarter of an inch or more. It is difficult and, in fact, may be considered as practically impossible, to obtain proper penetration such as to assure an efficient and reliable weld, when welding together pipe having a wall thickness materially greater than one-eighth of an inch, unless the pipe ends are so formed as to be directly exposed for their full wall thickness to the flame of the welding torch or the arc of the welding rod. For that reason, in welding together the ends of standard pipe lengths, the pipe ends are beveled to provide a welding trough extending the full wall thickness of the pipe ends, or substantially so. In cases where the pipe ends are to be secured together by a clamp type of joint, they are provided in their outer surfaces with circumferential grooves which receive the arms of a split clamping ring bolted in position about the pipe ends. This split ring contains a hollow sealing ring of rubber or like material, open at its inner side and having flexible lips fitting tightly about the pipe ends at the end surfaces thereof, the pressure fluid entering the sealing ring from within the pipe and serving to maintain a fluid tight seal between the latter and the lips of the sealing ring. The clamp type of joint referred to is known as the victaulic joint and is disclosed in the Tribe Patent No. 1,541,601. In the victaulic joint it is of importance that the lips of the sealing ring be disposed at or closely adjacent the end surfaces of the pipe ends, in order to assure a tight seal while avoiding necessity of using an excessively heavy and cumbersome clamping ring. It is not feasible to bevel the ends of pipe lengths intended for use with the victaulic coupling, and it is and has been the practice to keep in stock standard pipe lengths with beveled ends, for use in lines of piping employing welded joints, and standard lengths of pipe with unbeveled or square ends and with circumferential grooves in their outer faces, for use in lines of piping employing the victaulic type of joints. A practical result is that the pipe manufacturers and dealers are under the necessity of keeping on hand duplicate stocks of pipe, which is objectionable for obvious reasons. A further objection to the present practice referred to is that the standard pipe lengths frequently are of unnecessarily great wall thickness, in order that the end portions thereof may be grooved for reception of the arms of a clamp ring of a clamp type of joint, as above, which necessitates using in a standard pipe length an amount of metal greatly in excess of that actually required to withstand the internal pressure and stresses to which the pipe is subjected, in addition to necessitating beveling of the ends of the pipe lengths if they are to be welded together, as above described. With a view to avoiding the use of excess metal in a pipe length, it has been proposed to form the major portion of the pipe length of thin metal and to weld to each end thereof a thick walled end fitting or ring which may be grooved exteriorly for use in a clamp type of joint, may be exteriorly threaded for use in a screw type of joint, or may be beveled at its outer end and then used in a welded joint. A pipe length which has a thin wall for substantially its full extent, and is provided with relatively thick end fittings or rings, of the type just referred to, is disclosed in the Naylor Patent No. 1,943,035. The objection to that pipe length is that if the end fitting or ring is externally grooved for use in a clamp type of joint, it cannot be used in a welded joint, and vice versa. Accordingly, with the exception that the pipe length is thin walled, except for the relatively thick walled end rings or fittings, the last described pipe lengths are open to the same objections as the standard pipe lengths.

My invention is directed to the provision of pipe lengths and associated end members of such character that the same type of pipe lengths may be secured together either by a welded joint or by a clamp type of joint, and the objections above noted to the present known type of pipe lengths, above referred to, are avoided. To that end, I provide pipe lengths having end portions of sufficient wall thickness to have formed therein grooves for reception of the arms of a clamping ring of a clamp type of joint, the end surfaces of such portions being unbeveled and substantially normal to the axis of the pipe length, and the end areas of such portions being sufficiently reduced in wall thickness so as to be readily weldable in a manner to provide a highly efficient welded joint. More specifically, I provide the pipe lengths with end fittings of considerable wall thickness having formed therein circumferential grooves adapted for reception of the arms of a clamping ring, each of the fittings having an inner circumferential recess extending from its inner end, with reference to the joint, these recesses providing a channel for reception of a ring seating therein effective for spacing the inner ends of the fittings a predetermined distance apart, suitable for welding thereof together and to the ring, which when the joint is welded constitutes a chill ring. When a clamp type of joint is used, the ring seating in the recesses in the fittings accurately spaces the latter, also accurately spacing the grooves in the fittings, which facilitates mounting of the clamping ring on the fittings, thereby facilitating assembly of the joint. My invention is particularly suitable for use with thin walled pipe, rendering it possible to secure lengths of such pipe together by either a welded joint or a clamp type of joint, and I shall, therefore, disclose it as applied to thin walled pipe. Further objects and advantages of my invention will appear from the detail description.

In the drawings:

Figure 1 is a side view of a pipe joint assembly embodying my invention, as it appears prior to the welding operation;

Figure 2 is a sectional view taken substantially on line 2—2 of Figure 1;

Figure 3 is a sectional view on the order of Figure 2, of the upper portion of the joint after completion of the welding operation, on an enlarged scale; and Figure 4 is a lengthwise sectional view of the upper portion of a clamp type of joint embodying the pipe lengths and end fittings of my invention.

I have shown my invention, by way of illustration, as embodied in a joint comprising two pipe lengths 5 of relatively slight or thin wall thickness, disposed in endwise relation with an annular end ring or fitting 6 of materially greater wall thickness than pipe length 5, welded to the end of the latter at 7. It may be assumed that the wall thickness of the pipe length 5 is less than one-eighth of an inch and the wall thickness of the fitting 6 is not less than one-quarter of an inch, in order to provide for a circumferential groove 8 of appreciable depth formed in fitting 6. Each of the fittings 6 is further provided, in its inner face, with a circumferential recess 9 extending from its inner end, with reference to the joint to be formed. When the fittings 6 are disposed in endwise juxtaposition, the recesses 9 provide, in effect, a channel which receives a ring 10 seating therein. This ring is of such width that it spaces the inner ends of the fittings 6 apart a suitable distance, approximately one-sixteenth of an inch, providing an annular space 11 therebetween well suited to the welding operation, if the pipe lengths are to be secured together by a welded joint. It will be understood, of course, that each of the pipe lengths includes the thin walled length or portion 5 and the fittings 6 welded to the ends thereof. After the parts have been assembled as above, the ends of the fittings 6 are secured together and to the rings 10 by welding, preferably by arc welding with a welding rod. In that connection, it will be noted that the recess 9 is of considerable depth radially, so that the portion 9ª of fitting 6 corresponding to recess 9 has a wall thickness of about one-eighth of an inch, which is readily penetrated by the arc and which, for that reason, I term a welding thickness. By reducing the wall thickness of areas 9ª of fitting 6, in the manner stated, and providing the space 11 between the ends of fittings 6, the ends of the fittings and the area of the ring underlying space 11 are directly exposed to the arc during the welding operation and the end portions of areas 9ª, as well as the underlying area of ring 10, are readily fused and welded together, the parts being then united by a weld 12 and the space between the ends of the fittings 6 being filled with welded in metal. That renders it possible to secure the thin walled pipe lengths together by a highly efficient welded joint, with expedition and facility and without necessity for beveling the ends of the end fittings 6.

If desired, the pipe lengths may be secured together by a clamp type of joint instead of by welding. Referring to Figure 4, the grooves 8 of fitting 6 receive the arms of a channel clamp ring 13 which is formed in sections bolted together about the fittings, in a known manner. Within the clamp ring 13 there is a sealing ring 14, formed of rubber or other suitable material and of hollow construction, this ring 14 having flexible lips 15 which seat upon the outer faces of areas 9ª of the fittings 6, these lips extending to the inner ends of the fittings, or substantially so. In that connection, the lips 15 should have adequate sealing area on the fitting and the ends of the latter should not be beveled to any appreciable extent, since that would reduce the area of contact between lips 15 and the fittings and would also tend to direct the pressure fluid, escaping from the piping through space 11, beneath the lips 15, tending to compress the sealing ring 14 and causing leakage at the joint. As above stated, the joint shown in Figure 4 is known as the victaulic joint and the pressure within sealing ring 14, by the pressure fluid entering that ring through space 11, is relied upon to maintain the seal. It will be noted that the ring 10 spaces the inner ends of the fittings 6 a definite and predetermined distance apart, assuring a passage therebetween for flow of the pressure fluid into the sealing ring 14, which contributes to maintaining the joint fluid tight, avoiding likelihood of the fittings 6 being moved into tight endwise abutting contact in the operation of inserting them into sealing ring 14, such as may occur where the ring 10 or equivalent spacing means is not provided. That assures that the grooves 8 are properly spaced for reception of the arms of the clamping rings 13, which facilitates assembly of the joint.

It will be seen that by providing pipe lengths with end portions or fittings in accordance with my invention, I render it possible to secure the same type of pipe lengths together by either a welded joint or a clamp type of joint and, in particular, render it possible to secure together lengths of thin walled pipe by a joint of either of the two types referred to, as desired. Since pipe lengths embodying my invention are suitable for securing together by either welded joints or clamp type joints, my invention avoids the necessity of pipe manufacturers and dealers keeping on hand stocks of pipe lengths of the two different types of joints referred to, thus greatly reducing the inventory of pipe lengths which, in itself, is a practical advantage of considerable merit in addition to the advantages above referred to.

I claim:

1. A pipe end member for joining endwise to another similar member, said end member being of a wall thickness materially greater than welding thickness for the major portion of its length and having an interior circumferential recess extending from its inner end and an exterior circumferential groove disposed a substantial distance outward beyond said recess, the inner end portion of said member corresponding to said recess being of welding wall thickness.

2. As a new article of manufacture, a pipe end fitting of a wall thickness materially greater than welding thickness for the major portion of its length and having an interior circumferential recess extending from its inner end and an exterior circumferential groove disposed a substantial distance outward beyond said recess, the inner end of said fitting being substantially straight radially thereof and the inner end portion of said fitting corresponding to said recess being of welding wall thickness.

3. In an assembly for forming a victaulic pipe joint and a welded pipe joint optionally, two pipe lengths of welding wall thickness, two end fittings welded to the inner ends of said pipe lengths with their inner ends juxtaposed, each of said fittings being of a wall thickness materially greater than welding thickness for the major portion of its length and having an interior circumferential recess extending from its inner end, each fitting being further provided with an exterior circumferential groove disposed outward beyond said recess a distance providing a seating surface for a sealing ring of a victaulic joint and adapted for reception of the arm of a channel clamp ring of such a joint, the inner end portions of said fittings corresponding to said recesses being of welding thickness and thereby adapted to be welded together.

EDWARD HALL TAYLOR.

REFERENCES CITED

The following references are of record in the file of this patent:

UNITED STATES PATENTS

| Number | Name | Date |
|---|---|---|
| 1,236,145 | Burns | Aug. 7, 1917 |
| 1,978,453 | Flynn | Oct. 30, 1934 |

FOREIGN PATENTS

| Number | Country | Date |
|---|---|---|
| 353,798 | Great Britain | July 30, 1931 |
| 487,863 | Great Britain | June 27, 1928 |